United States Patent [19]

Karpa

[11] Patent Number: 4,658,921

[45] Date of Patent: Apr. 21, 1987

[54] DEVICE AND PROCEDURE FOR TESTING HEAVY CAPACITY SCALES

[76] Inventor: Michael J. Karpa, P.O. Box 408, Station B, Hamilton, Ontario, Canada, L8L 7W2

[21] Appl. No.: 797,403

[22] Filed: Nov. 12, 1985

[51] Int. Cl.⁴ .................. G01G 19/52; G01L 25/00
[52] U.S. Cl. ........................... 177/50; 177/146; 73/1 B
[58] Field of Search ............ 177/50, 145, 146; 73/1 B

[56] References Cited

U.S. PATENT DOCUMENTS

| | | | |
|---|---|---|---|
| 1,112,320 | 9/1914 | Price | 177/146 |
| 3,194,050 | 7/1965 | Ruge | 73/1 B |
| 4,090,393 | 5/1978 | Kharitonov et al. | 73/1 B |

OTHER PUBLICATIONS

Morehouse Universal Calibrating Machine, Bulletin 158, Morehouse Machine Co., 1742 Sixth Ave., York, Pa.

Primary Examiner—George H. Miller, Jr.

[57] ABSTRACT

A device for testing heavy capacity scales by providing a means for accurately loading such scale platforms by using a simple load cell incorporating column thruster reacting against the scale deck or platform said column being restrained by the scale baseplate supports or from the foundation footings. The column is kept vertical and the load cell output gives an accurate readout of the load applied to the platform. The procedure consists of loading locally over each platform support point to a loading value equal to the maximum load that each support point would experience under the worst condition of full capacity loading. By using this system electronic scales can be calibrated and subsequently checked for accuracy and recalibrated by adjusting the individual support load cell outputs. Mechanical scales can be also tested using this device and procedure and are adjusted as if the said column thruster were stacked dead weight test weights.

12 Claims, 4 Drawing Figures

DEVICE AND PROCEDURE FOR TESTING HEAVY CAPACITY SCALES

BACKGROUND OF THE INVENTION

This invention relates to a simple device and procedure for accurately setting up heavy capacity scales (such as truck and railway track scales) and for subsequently checking and readjusting such machines in order to maintain their accuracy of weight determination.

Normally in setting up or calibrating any scale installation dead weights of known certified weight are used. For scales of heavy capacity (truck and track scales of 100,000 lbs plus capacity) it is common practice to use known test weights amounting only to a fraction weighwise of the scale capacity—20,000 lbs, for example, in the case of truck scales. After the scale under test has been adjusted to indicate correctly the test weight value, substitute dead weight material (of about the same weight as the test weight) is placed on the scale and the test weight is used as an addition to set up the scale further up its capacity range. This procedure is repeated until the scale has been set up or calibrated all the way up to its full capacity. This procedure is not only used on calibration of new installations but is also used to periodically check all scales which are in service.

This substitution procedure method of scale calibration has some inherent disadvantages and limitations which are listed below as follows:

(1) The handling (cranes are required), transportation and maintenance of 20,000 lbs of certified test weights is a very costly item with modern test trucks costing in excess of $100,000.00. Furthermore with modern truck scales going up in capacity (it is not uncommon to find truck scales rated 100 tons) 20,000 lbs of test weights is generally thought to be insufficient to do a proper scale calibration. In testing track scales it becomes necessary to provide specialty test cars in additiont to having at least 20,000 lbs of certified test weights.

(2) The dead weight substitution material is usually difficult to obtain at most sites particularily in weight values approaching the ideal 20,000 lbs increments. There is also at least one increment of uncertainty in the substituted material weight value unless great care is taken to establish the weight to the nearest increment of resolution.

(3) The procedure of handling test weights and substituting dead weight material is quite time consuming and the problem arises of being able to differentiate between errors of weighing and normal zero movement due to temperature changes, etc which occur on all electronic scales with the elapse of time.

SUMMARY OF THE INVENTION

The present invention overcomes these drawbacks by using a relatively simple reactive loading device incorporating a calibrated precision load cell standard with indicator and a means of generating a thrust or force against the scale platform. The cost of this accurately measured loading arrangement is a small fraction of the cost of a fully equipped test truck or test car; the load cell used in this device could be the customer's spare unit as could be the indicator, consequently the method is easily affordable for all scale owners. The principle behind this simple test idea lies in the demonstratable fact that for scales of a proven or approved design the test for accuracy can be reduced to one of loading each support point (for load cell scales this means loading over each load cell) in turn over a loading range equal to the maximum load that each point can receive under the worst possible scale full load condition. If under such loading the scale indicates true weight values (as compared to the load cell standard in the thruster device) for all support points it will indicate correct weight values for the whole platform no matter what the overall platform loading pattern or load distribution. For some special scales cells can be loaded in pairs; also rough checks can be quickly done by loading cells in pairs or even in groups of 3, 4 or more. When testing scales of a new design it is additionally required to determine the effects of load location, platform deflection and other factors concerned with the scales ability to weigh accurately. This, however, need only be done on one prototype of a new scale type or perhaps a new installation to check workmanship and/or faulty material in the weighbridge structure itself. The large majority of scale tests now being done are in the nature of annual or biannual inspections of scales of proven or approved type design; all these can be easily done by the device and procedure according to this invention. The test method herein outlined permits all support points in heavy capacity scales to have their full working range quickly tested thus eliminating environmental influences such as temperature affects on zero, wind on built up stacked weights, etc. It should also be noted that variations in gravity (primarily due to altitude changes) will affect this method of scale testing. However the change in the gravity constant "g" in a normal scale service area is negligible and in any case can be easily corrected for.

GENERAL DESCRIPTION

The device according to this invention consists essentially of a mechanical thruster in the form of a column or strut which incorporates a calibrated precision load cell standard and a means for developing a compressive load in the column such as a hydraulic loading jack. The lower end of this thruster assembly reacts against the scale platform normally at a support point and the upper end is restrained by a reaction block which is attached by tension members to the base plate anchor bolts, or support base or to the foundation footing. The jack develops the platform loading force and the load cell which is connected to a calibrated readout instrument accurately indicates the amount of load. A pressure guage in the hydraulic system could be used as a rough indication of the load; this may be useful for strain and overload tests on the scale but is not accurate enough for precision weighing such as legal for trade applications. It is very important that the load in the column thruster be introduced to the platform without the simultaneous presence of side forces hence a relatively long strut with hinged ends is used. To ensure that the loading column is thrusting in a vertical direction (and hence eliminate the so-called 'cosine error") a number of different type of levelling devices can be used. For cases where provision has not been made for attaching the tension members to the support base plate area the upper reaction block is made to react against a beam which straddles the scale platform and attaches to the foundation footing at each end. A similar reaction beam is required for cases where the load cells are mounted outboard of the scale platform proper.

DETAILED DESCRIPTION OF THE DRAWINGS

The present invention will now be described with reference to the accompanying drawings with like components having the same numbers in the different alternatives.

Figure 1:
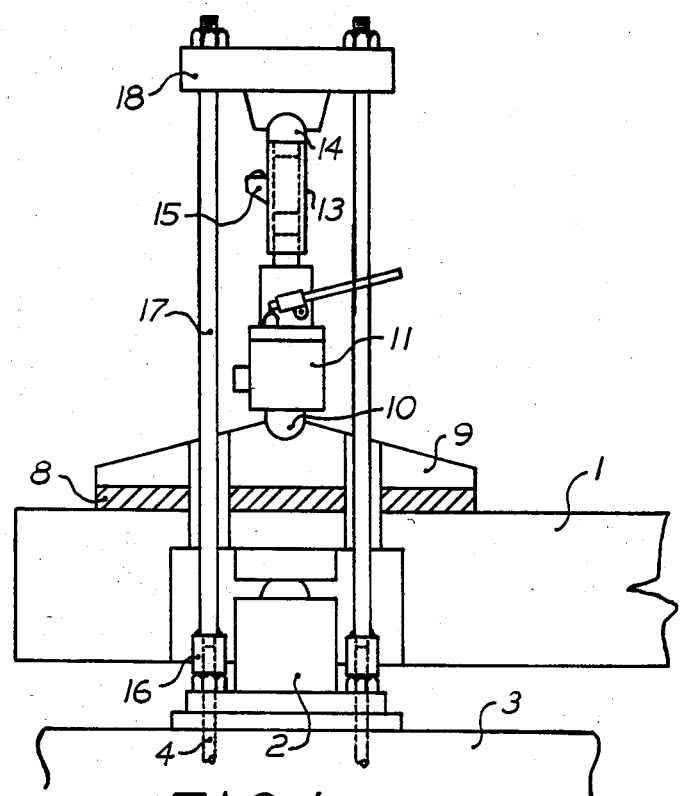
FIG. 1 shows the loading device over a load cell in a platform with the reaction block fastened to the support base-plate anchor bolts.

In FIG. 1 we have a loading device located over a support of a low profile scale platform 1 which rests on a series of pairs of load cells one of which is shown as 2. Said cells 2 rest on a foundation footing 3 which has anchor bolts 4 imbedded in it. Fastened to the upper threaded part of these bolts 4 is a nut 16 which is welded to a tension rod 17 which pass through clearance holes in the platform 1 and have their other end fastened to an upper reaction block 18. Between the platform 1 and the upper block 18 is located the loading assembly consisting of a rubber or wood distribution block 8 with a load adaptor 9 on top which in turn incorporates a spherical seat 10 one part of which is fastened to a precision load cell 11. A cylindrical hydraulic jack 12 with a ram extension 13 and another upper spherical seat assembly 14 completes the loading assembly. All that is further required now is to connect the load cell 11 to a calibrated readout instrument and accurate loading can be done by actuating the hydraulic jack 12 and reading the instrument. Fixed on the side of the ram extension 13 we have a bubble type level 15 which enables one to make necessary adjustments so that the platform is loaded precisely vertically. The spherical assemblies 10 and 14 ensure that negligible horizontal forces are introduced to the platform 1.

Figure 2:
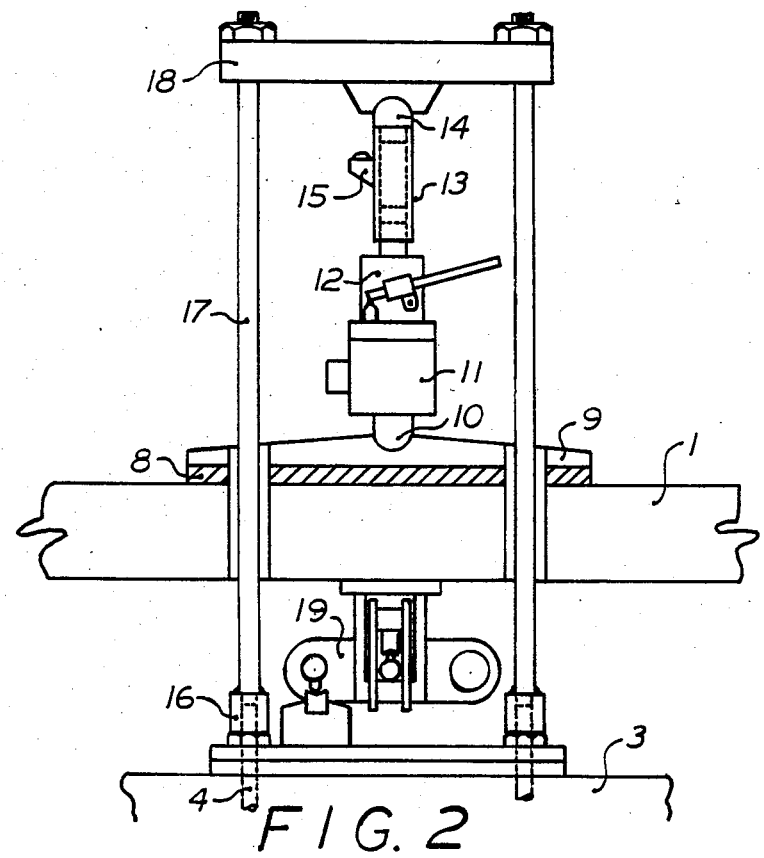
FIG. 2 shows essentially the same arrangement as FIG. 1 but deployed over a mechanical scale support pivot.

FIG. 2 shows essentially the same device as in FIG. 1 but in this case it is located over a typical mechanical scale pivot assembly 19.

Figure 3:
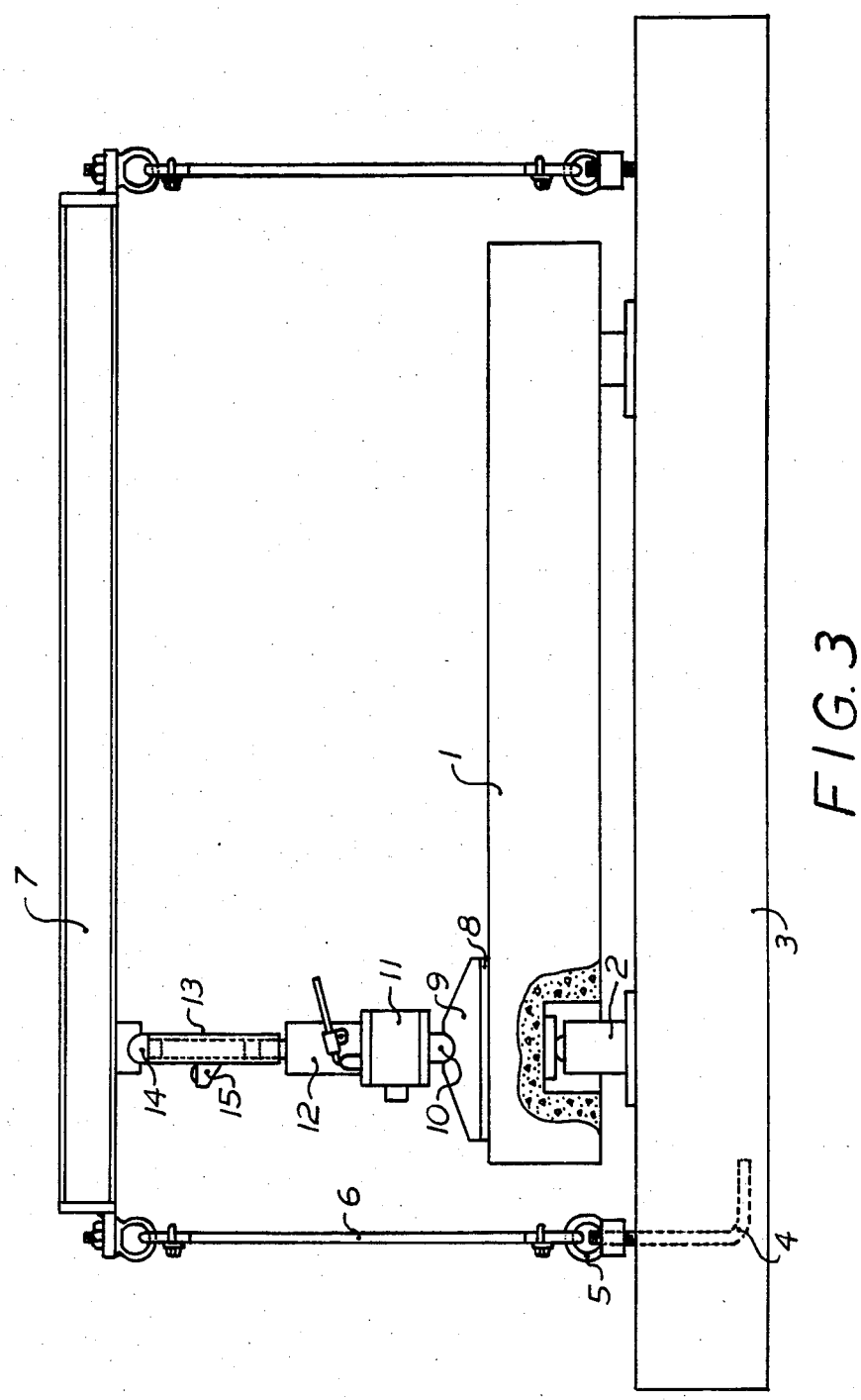
FIG. 3 shows a side view of the loading device on a typical scale platform cross-section with the reactive beam connected to the foundation footing.

In FIG. 3 we have a loading device with the same loading column elements as in FIGS. 1 and 2 with the exception that the upper reaction block 18 is now backed up by using a horizontal beam member 7. To develop the reactive force for the upper block 18 the said beam 7 straddles the platform 1 and has its ends attached to cables 6 which attach in turn by threaded clevises 5 to anchor bolts 4 imbedded in the foundation footing 3.

Figure 4:
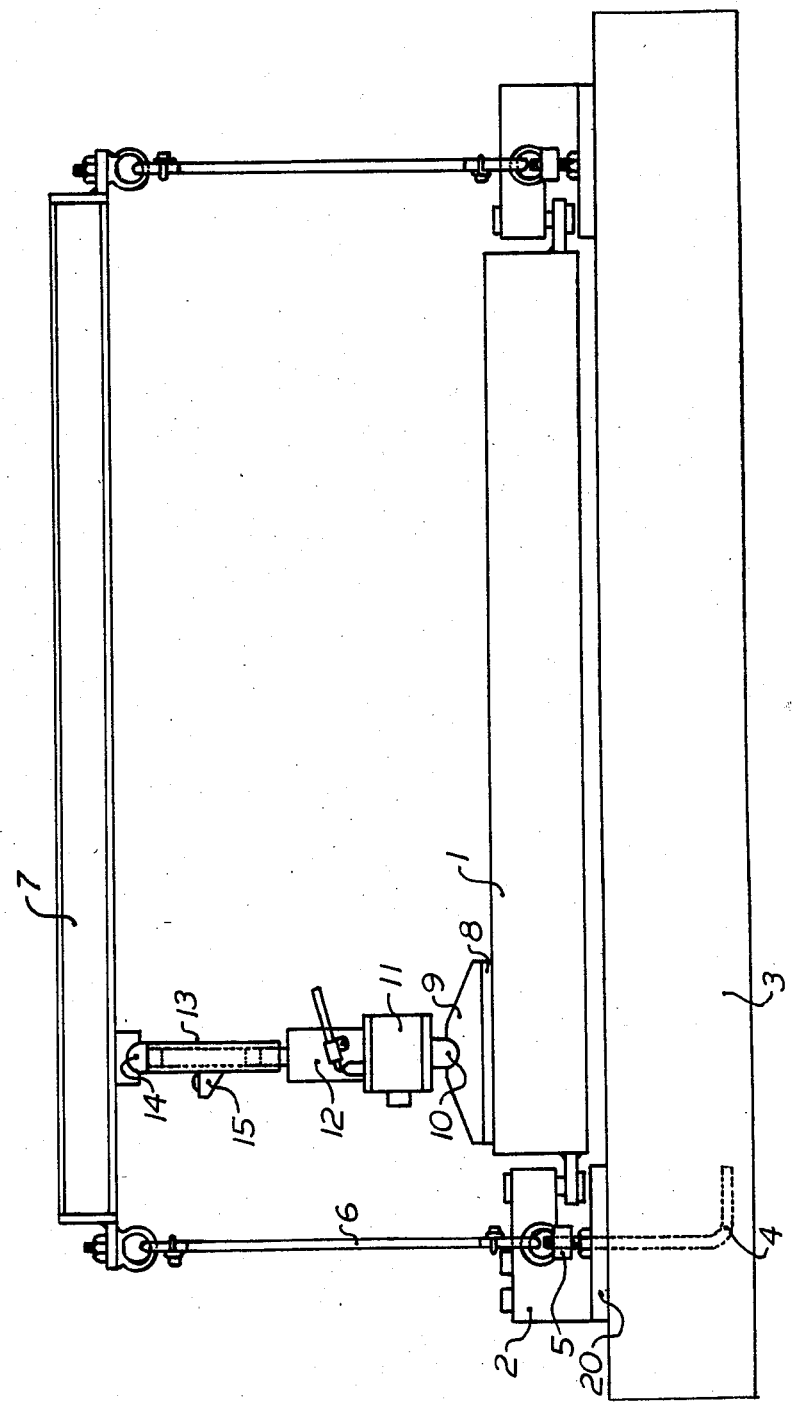
FIG. 4 shows an arrangement similar to FIG. 3 with a reactive beam, outboard cells and connections to the cell base plate anchor bolts.

FIG. 4 shows an arrangement similar to FIG. 3 but adapted for scales with outboard mounted load cells 2. The cable 6 and its attached clevis 5 are affixed to the anchor bolt 4. Said anchor bolt 4 is imbedded in the foundation footing 3 is also used to hold down the load cell baseplates 20.

Although the invention has been described with reference to some specific application embodiments a number of details can be altered without affecting the basic principle of the concept. For example in place of the compression load cell 11 in the loading column one could use 2 tension cells in the tension rods or cables, in fact a single tension cell in one of the tension members and precise spacing of the active and reactive force lines would work as well. Furthermore by varying the spacing between the tension cell and load point vs dummy tension member and load point it becomes possible to use a tension cell of greatly reduced rating. The hydraulic jack could be replaced by a power screw; the cross beam 7 in FIGS. 3 and 4 can be a light truss type structure; and the anchor bolts 4 could be a variety of concrete lifting insert devices commercially available in precast concrete work. It is not necessary to attach the tension members to the support baseplate anchor bolts as the system would work just as well connected to any rigid detail (baseplate itself, base of load cell, load cell mounting bolts, etc.) in the support area. As far as the procedure is concerned the loading can be simplified by arranging the loading thruster between load cell pairs or one loading point for a 4 cell scale platform panel; the scale testing procedure would be greatly speeded up with some loss of calibration accuracy unless specially "corner adjusted" load cells are used.

What is claimed is:

1. A device for accurately loading heavy capacity scales for purposes of determining their accuracy, said scales comprising a load receptacle with a plurality of well defined support points, load sensing mountings and a supporting foundation; said device to be deployed at various locations over a scale under test and said device consisting of:
    (a) a loading column having an upper and a lower end and incorporating a calibrated load cell,
    (b) said loading column incorporating a force generating means to develop the column load,
    (c) a means for ensuring that said loading column is vertically positioned during loading,
    (d) having the lower end of said loading column thrusting against the scale load receptacle through a hinged or pivoting joint,
    (e) having the upper end of said loading column thrusting against a reaction block through a hinged or pivoting joint,
    (f) with the said reaction block fastened to a load sensing mounting or supporting foundation by tension members and
    (g) a means for precisely reading out the load in the loading column load cell by known means.

2. A device of claim 1 but wherein the scale load receptacle comprises a loading frame or platform for highway trucks or rail guided vehicles.

3. A device of claim 1 or 2 but wherein a tension load cell is used in one of the tension members instead of the compression load cell in the loading column.

4. A device of claim 1 or 2 but wherein a tension load cell is used in each of the tension members instead of the compression load cell in the loading column.

5. A device of claim 1 or 2 wherein the force generating means is a hydraulic jack.

6. A device of claim 1 or 2 wherein the force generating means is a mechanically leveraging mechanism.

7. A device of claim 6 wherein the mechanically leveraging mechanism is a power screw.

8. A device of claim 6 wherein the mechanically leveraging mechanism is a wedge.

9. A device of claim 1 or 2 but wherein the force is developed in the loading column by incorporating a pulling device into one of the tension members holding the loading device to a load sensing mounting or supporting foundation.

10. A procedure for accurately loading heavy capacity scales using the device of claim 1 or 2 wherein said device is deployed in turn over each support point and is loaded to the maximum support point capacity.

11. A procedure for accurately loading heavy capacity scales using the device of claim 1 or 2 wherein the loading procedure is simplified so that support points are loaded in pairs to their maximum capacity.

12. A procedure for accurately loading heavy capacity scales using the device of claim 1 or 2 wherein the loading procedure is further simplified so that the scale support points are loaded in multiple groupings that correspond to a scale section or panel with the loading taken to the corresponding capacity.

* * * * *